United States Patent [19]
Sielk

[11] 3,788,160
[45] Jan. 29, 1974

[54] OPERATING MECHANISM FOR A MOTOR VEHICLE SLIDING ROOF

[75] Inventor: Werner Sielk, Cologne, Germany

[73] Assignee: Ford Motor Company, Dearborn, Mich.

[22] Filed: June 12, 1972

[21] Appl. No.: 261,897

[30] Foreign Application Priority Data
Nov. 24, 1971 Germany.................. 2158193

[52] U.S. Cl. ........................ 74/501 R, 296/137 G
[51] Int. Cl. ............................................ F16c 1/10
[58] Field of Search ..... 74/501, 502, 506, 526, 565; 49/209, 210; 52/72; 296/137 R, 137 B, 137 E, 137 F, 137 G

[56] References Cited
UNITED STATES PATENTS
3,148,913  9/1964  Golde ........................... 296/137 G
3,266,328  8/1966  Rott............................... 74/501 X Primary Examiner—Charles J. Myhre
Assistant Examiner—Frank H. McKenzie, Jr.
Attorney, Agent, or Firm—Keith L. Zerschling; John J. Roethel

[57] ABSTRACT

An operating mechanism for the sliding roof panel of a motor vehicle, which roof panel can be moved through the medium of a push-pull cable itself displaceable by means of a hand-operated crank. Displacement of the cable in the forward direction when the sliding roof panel is closed, raises the rear edge of the roof. Displacement of the cable in the rearward direction, when the roof is closed, lowers the sliding roof and moves it rearwards.

The cable is provided with a projecting abutment cooperating with a lever arm provided with a pair of spaced stops selectively engageable by the cable carried abutment. By means of a lever operable manually, the position of the lever arm carrying the abutments may be altered so as to enable cable movement only in one direction.

2 Claims, 3 Drawing Figures

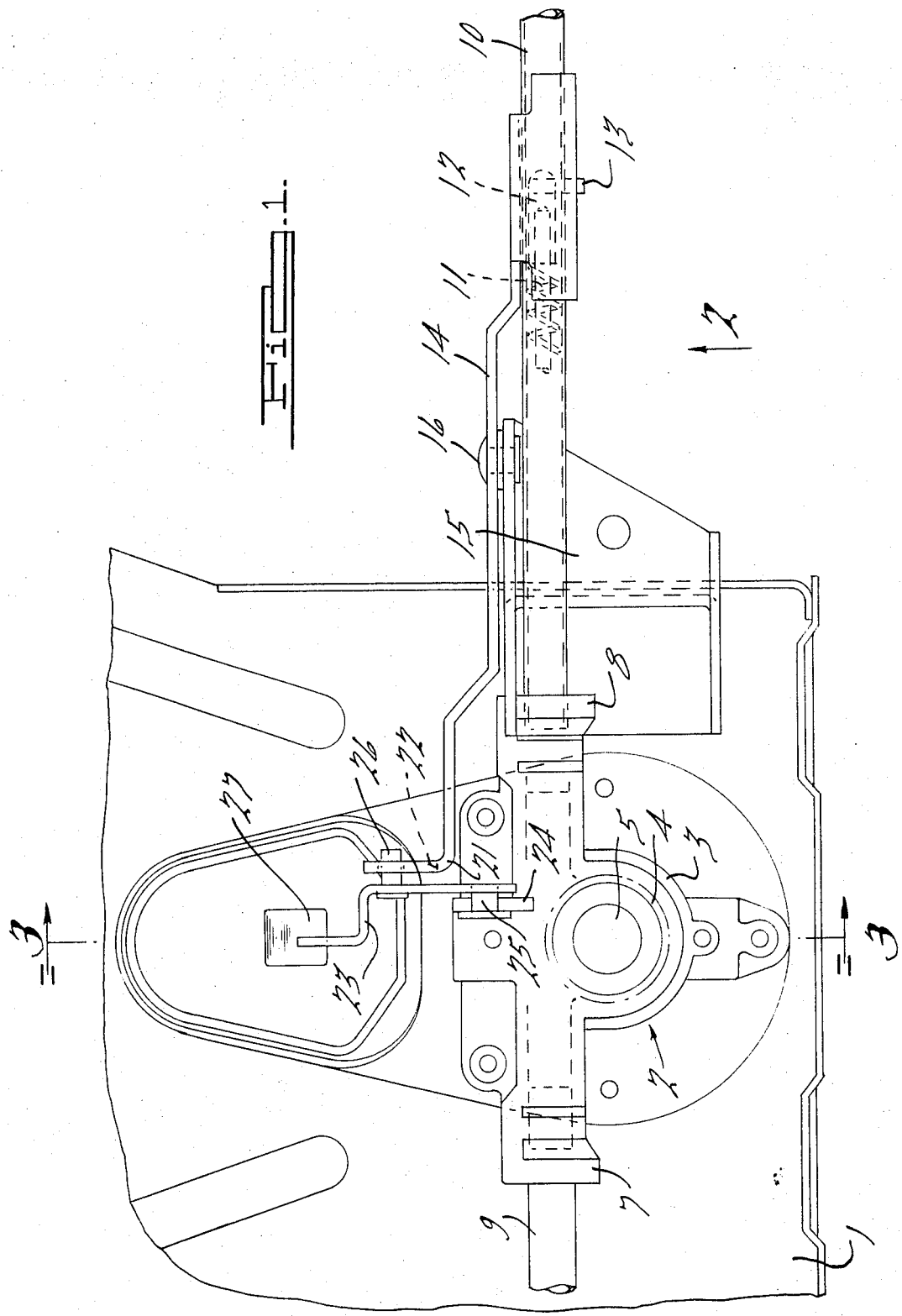

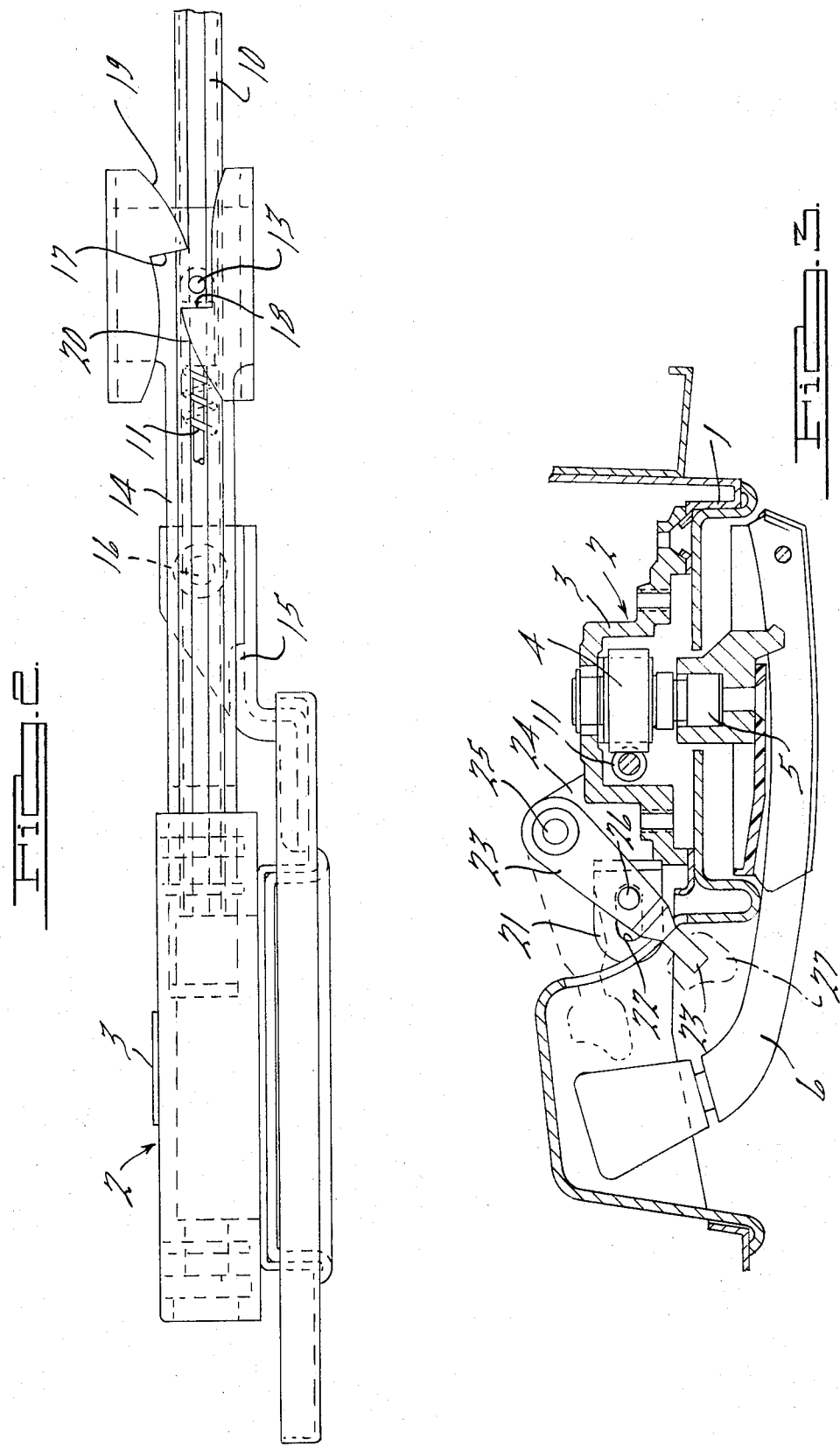

OPERATING MECHANISM FOR A MOTOR VEHICLE SLIDING ROOF

BACKGROUND OF THE INVENTION

Operating mechanisms for moving the sliding roof panel of a motor vehicle through the medium of a push-pull cable itself displaceable by means of a hand-operated crank are known to the prior art. Displacement of the cable in the forward direction, when the sliding panel is closed, raises the rear edge of the roof. Displacement of the coiled cable in the rearward direction, when the roof is closed, lowers the slidable roof panel and moves it backward.

In one known operating mechanism of the kind introductorily described, displacement of the cable in the forward direction is produced by rotating the hand-operated crank to the right, viewing the handle from below in its position on the vehicle roof, and displacement of the cable towards the rear by rotating the crank towards the left.

If the driver of a motor vehicle has lowered the sliding roof panel and displaced it backwards, by rotating the crank a few turns to the left, then in order to close it he must rotate the crank a few turns to the right. Between the entry of the sliding roof panel into the closed position, by forward displacement of the cable, and the outward deflection of the rear edge of the sliding roof by the same movement of the cable, the cable has a short lost motion. This lost motion cannot be clearly detected by the driver of the vehicle who is operating the crank of the sliding roof panel while the car is moving for example, and who has to devote his full attention to what is happening on the road. There is therefore the risk that the driver will continue rotating the hand-operated crank to the right with the intention of closing the sliding roof, until on encountering a higher resistance again, he believes he has reached the final position. It can happen in this context, however, that the sliding roof panel has actually reached a point where its rear edge is slightly lifted out. This kind of inaccurate closure of the sliding roof can, of course, adversely affect the seal which is obtained.

A similar difficulty occurs when the driver has initially set the sliding roof panel for outward deflection, and now wishes to close it by turning the handle a few turns left. Here, again, the lost motion between the two opening functions cannot be very readily detected and so the risk once again arises that the sliding roof panel will be lowered somewhat again, due to the handle being rotated too many turns to the left. This kind of inaccurate closing again runs the risk of producing an inadequete seal.

The object of the invention is therefore to overcome these drawbacks of the known kind of operating mechanism for the sliding roof of a motor vehicle, the two opening functions of outward deflection and displacement, being clearly separated from one another.

SUMMARY OF THE INVENTION

In accordance with the invention, this object is achieved in that the free end of the operating cable is provided with a transverse projecting pin or abutment which cooperates with stops located opposite one another at an interval and act in correspondence with opposite directions of motion of the pin, these stops being arranged above a manually operable lever and being capable of arrangement in two different operating positions in which in each case only one of the possible directions of movement of the pin on the cable is clear.

The stops which act in correspondence with opposite directions of movement of the pin, exhibit ramps which when the pin is returning from the cleared direction of motion and the stops are subsequently pivoted, pivots these latter back into the original operating position.

The invention thus provides an operating mechanism for the sliding roof panel of a motor vehicle, which has two opening functions each of which can be preselected by the operation of the lever and the other thus automatically inhibited. Moreover, it is ensured that when the sliding roof is in one opened position and the locking lever is subsequently pivoted, no fault occurs during the closing movement of the sliding roof panel and instead the desired blocking in the closed position is achieved.

DESCRIPTION OF THE DRAWINGS

The invention will be explained in more detail making reference to an example illustrated in the attached drawings.

FIG. 1 illustrates a plan view of an operating mechanism in accordance with the invention;

FIG. 2 illustrates a side elevation of the operating mechanism less the drive mechanism and handle in the direction of the arrow 2 shown in FIG. 1; and FIG. 3 illustrates a section through the operating mechanism along the line 3—3 of FIG. 1.

DETAILED DESCRIPTION OF THE INVENTION

The operating mechanism as shown in FIG. 1 is attached in the motor vehicle to the front, bottom edge of the opening for a sliding roof panel.

The operating mechanism consists of a base-plate 1 which is attached by screws (not shown), to the reinforcing frame surrounding the roof opening. Attached to the base-plate 1 there is a drive housing 2 whose approximately semicircular center section 3 contains a rotatably mounted helical gear 4 whose driveshaft 5 exits beneath the housing and is secured for rotation with a preferably foldable hand-operated crank 6. The housing 2 furthermore has cylindrical side portions 7 and 8 which contain the guide sleeves 9 and 10 in which a push-pull coiled cable 11 is arranged. The cable 11 is guided through the guide sleeves 9 and 10 and guides in the housing 2, past the helical gear 4 and engages with same after the manner of a rack and pinion drive. With rotation of the gear 4 through the medium of the hand-operated crank 6, the cable 11 is thus displaced to the left or right so that that end of the cable 11 which engages the sliding roof, is displaced towards the front or the rear.

The guide sleeve 9 can in this context be closed for the major part, while the guide sleeve 10 is slotted in order to enable a transversely projecting pin or abutment 13 arranged at the free end 12 of the cable 11 to move.

Successively parallel to the guide sleeve 10 there is a double-armed lever 14 which is mounted pivotally through the medium of the rivet 16 on a bracket 15 attached to the base-plate 1. The lever 14 is provided at its free end with two stops 17 and 18 which cooperate with the pin or abutment 13 in opposite directions of motion thereof. The stops 17 and 18 have ramps 19 and 20. The other end of the lever 14 is provided with an arm 21 bent at right angles and containing an elongated hole 22.

More or less perpendicular to the lever 14 there is a locking lever 23 which is pivotally assembled through a rivet 25 on a bracket 24 carried by the housing 2. Substantially at its center, the locking lever 23 carries a pin 26 which is engaged in a slotted hole 22 formed in the arm 21 of the lever 14. At its free end, the locking lever 23 carries a knob 27 by means of which the dirver can operate it in the recess of the hand-crank 6.

In the bottom position, shown in full line in FIG. 3, of the locking lever 23, the free end of the lever 14 carrying the stops 17 and 18, is in the position shown in FIG. 2. In this operating position of the stops 17 and 18, the cable, shown in FIG. 2, can only move towards the right. With displacement of the free end of the cable 11 towards the right, however, that end of the cable 11 engaging the sliding roof panel, is displaced towards the rear in the position occupied by the locking lever in FIGS. 3 and 2, therefore, it is only possible to lower the sliding roof panel and displace it towards the rear.

If, with the sliding roof lowered and displaced towards the rear, the locking lever 23 should happen to have been pivoted into the position which it occupies in broken line in FIG. 3, then the ramp 19 and the stop 17 ensures that the lever 14 carrying the stops 17 and 18 is pivoted back into its original operating position by the pin 13, on cable 11, as it returns from the cleared direction of motion. Thus, in this situation too, proper attainment of the closed position is made possible and inadvertent overshooting of this position is prevented.

In the position shown in FIG. 3 in broken line of the locking lever 23, the lever 14 is pivoted and the stop 17 moves into the path of motion of the pin 13 carried by the cable 11. In this context, considering FIG. 2 the cable 11 can only move towards the left. With this movement of the free end of the cable 11, that of its ends engaging the sliding roof is displaced forwards. In this position of the locking lever 23, thus only the outward deflection of the rear edge of the sliding roof is possible.

Here, again, subsequent displacement of the locking lever 23 has no influence upon the effectiveness of the locking of the sliding roof in its closed position.

It is to be understood that the invention is not limited to the exact construction illustrated and described above, but that various changes and modifications may be made without departing from the spirit and scope of the invention as defined by the following claims.

I claim:

1. An operating mechanism means for a sliding roof panel mounted on a support means within the roof structure of a motor vehicle, comprising:

push-pull cable means coupled to the sliding roof panel for moving the latter longitudinally of the vehicle roof, displacement of the cable in a direction forwardly of the vehicle, when the roof panel is closed, causing the rear edge of the panel to be raised, and displacement of the cable in the rearward direction, when the roof panel is closed, causing the rear edge of the roof panel to be lowered and the panel to be moved rearwardly, hand-operated crank means supported on the vehicle roof structure drivingly engaged with the push-pull cable means, and control means for restricting movement of the push-pull cable means to a predetermined direction, characterized in that the control means comprises:

an abutment means coupled to the cable means for axial movement with the latter, the abutment means projecting transversely of the longitudinal axis of the cable means, and manually operable lever means mounted on the support means and having at one end opposed stops, the lever means being positionable in either of two operating positions to swing one or the other of the stops laterally into the path of movement of the abutment means thereby to restrict movement of the cable means in blocked direction while permitting movement in the other direction.

2. An operating mechanism according to claim 1, in which:

each of the opposed stops has a ramp portion, the cable means abutment upon being returned from a direction of unrestricted movement being adapted to engage a ramp portion, if the latter is in its path, to swing the lever in a direction to move the stop carrying the other ramp portion into the path of the abutment into position to terminate such return movement at roof closed position.

* * * * *